April 13, 1937. J. F. FAIR 2,076,940

AUTOMATIC SELF LOCKING CLOTHESLINE FASTENER

Filed Jan. 18, 1934

INVENTOR.
James Frank Fair
By his Attorney
John A. Harrison.

Patented Apr. 13, 1937

2,076,940

UNITED STATES PATENT OFFICE 2,076,940

AUTOMATIC SELF LOCKING CLOTHESLINE FASTENER

James Frank Fair, New Kensington, Pa., assignor to Jessie G. Fair, New Kensington, Pa.

Application January 18, 1934, Serial No. 707,073

2 Claims. (Cl. 24—133)

My invention relates to a clothes line fastener including a self-locking clamping element which moves into and is held in locked position by the tension of the secured line. While fasteners of this general sort are years old, they have met with little success commercially—some were costly to manufacture, others were difficult to operate and were inadequate in service. My invention consists in specific refinements in structure, by virtue of which economy in manufacture and efficiency in service are obtained in largest measure.

In the accompanying drawing Figure 1 is a view in perspective of a fastener embodying my invention, and illustrating a clothes line, as it is looped in the fastener and before tension is applied to the line.

Figure 4:
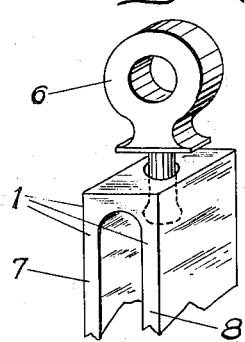
Figure 4 is a fragmentary view of the fastener, illustrating a modification in the means for mounting the fastener.

Referring to the drawing, my structure comprises a yoke having two legs 7 and 8 extending in parallelism from a base 4, which base is adapted to be secured to a post, or other support, by means of nails or screws. The structure is formed of metal which may be cut and pressed or stamped into the desired shape, or which may be molded of metal, such as iron or aluminum. In modification, a swivel-eye 6 (Figure 4) or a lag-screw 5 (Figure 5) may be provided as the means for mounting the yoke upon a support.

A clamping element 2 is by a pin 3 pivotally mounted between the distal ends of the legs 7 and 8 of the yoke. It will be observed that the clamping element 2 is a simple device of general U-shape. The arms 10 and 11 of the U lie spaced from and on opposite sides of the yoke legs 7 and 8; the arms are curved inward toward one another, and are directed toward the base of the yoke, providing hook portions which form with the base (2) of the U round notches 10a and 11a respectively.

Figure 5:
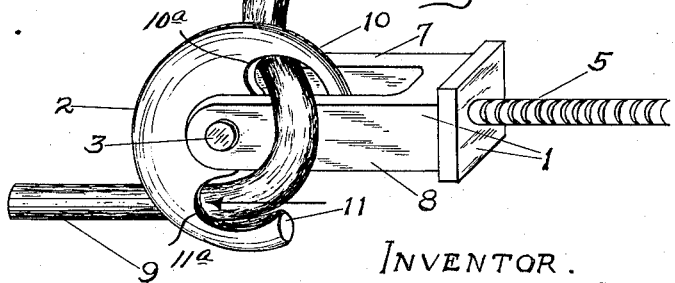
Figure 5 is a perspective view of the fastener, illustrating still another modification.

In securing the end of a line or rope 9 in my fastener, cf. Figure 5, the end 9a of the line is positioned astraddle the top edges of the yoke arms 7 and 8 and beneath the hook portion 10. The main reach of the rope is passed from beneath the hook portion 10, down the side of the arm 8, and between the bottom edges of the arms 7 and 8 and hook portion 11. Under the tension applied to the line 9, tension produced by the weight of the line and/or by an imposed load, the line 9 exerts against notch 11a a thrust in the direction of the arrow indicated in Figure 5. And in consequence of such thrust the clamping element tends to rotate clockwise, thereby causing the hook portion 10 to wedge the embraced body portion of the line between the top edges of the yoke arms 7 and 8 and the notch 10a. Thus, the end of the line is securely fastened.

The release of the clothes line fastener is a simple operation. By applying a slight upward pressure to the lower hook portion 11 of the clamping element 2, see Figure 5, the upper hook portion 10 is moved upward, thus releasing the pressure on the line 9 so that it can be easily withdrawn.

Figure 1:
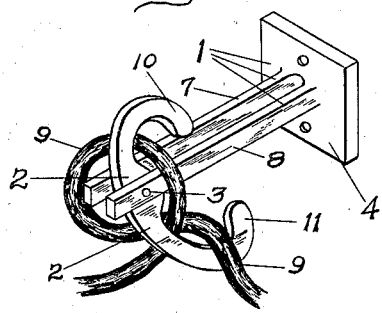
Figure 2:
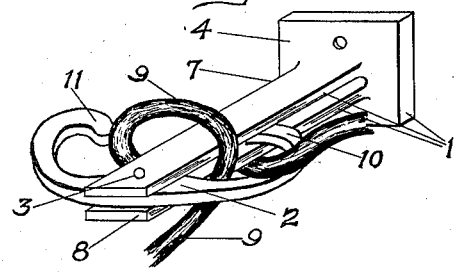
Figure 2 is a similar view of the above, but with the grip held in a horizontal instead of a vertical position.

The fastener may be installed and used with the axis of pin 3 extending horizontally, as shown in Figures 1 and 5, or with the axis of the pin extending vertically, as shown in Figure 2. The fastener may be used as an intermediate fastener, that is, a fastener engaging a line between its otherwise secured ends. Figures 1 and 2 illustrate how, in such case, the intermediate body portion of a line 9 is positioned in the device. It will be manifest that, if one of the two reaches of the continuous line secured in the fastener should break, the other reach remains secure, as it requires tension on only one of the two reaches to obtain the operation already described.

Figure 3:
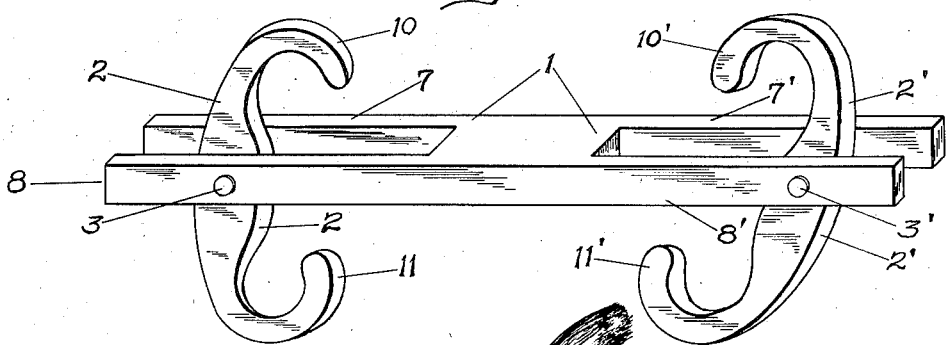
Figure 3 is a perspective view of the clothes line fastener, so developed as to be used as a splice to repair a broken line between two terminals.

The self-locking clothes line fastener or splice, shown in Figure 3, is of value when the clothes line 9 breaks between two supports. The ends of the broken line are severally threaded through the two clamping elements 2, 2' in the manner already described in connection with Figure 5.

My invention is not limited to clothes line use alone, but will hold the necessary tension on the guy ropes of tents, awnings, tennis court nets, extension ladders and numerous similar devices where tension is required on a line.

Having thus described my invention, I claim:

1. A device for securing rope or the like, comprising a yoke including two spaced-apart legs, means for mounting the yoke upon a support, and a clamping element pivotally mounted between the distal ends of said legs, said clamping element including two rope-engaging portions directed toward the base of the yoke and being adapted, upon rotation of the element, to swing between said legs, one of said portions being adapted to engage a body of rope passed beneath it and arranged astraddle the top edges of said legs, with the rope extending therefrom and between the bottom edges of said legs and the other of said rope-engaging portions of said clamping element, said last rope-engaging portion being adapted to impart rotative stress to said clamping element in response to tension applied to the rope extending therefrom, whereby the first-mentioned portion of said clamping element wedges the straddling portion of said body of rope between said legs.

2. The structure of the next-preceding claim, in which a rope-engaging notch is provided in the region of mergence of each rope-engaging portion of the clamping element with the intervening body portion thereof, substantially as described.

JAMES FRANK FAIR.